A. WEISBERG.
AUTOMOBILE SIGNAL.
APPLICATION FILED FEB. 17, 1921.
1,411,392.
Patented Apr. 4, 1922.
2 SHEETS—SHEET 1.
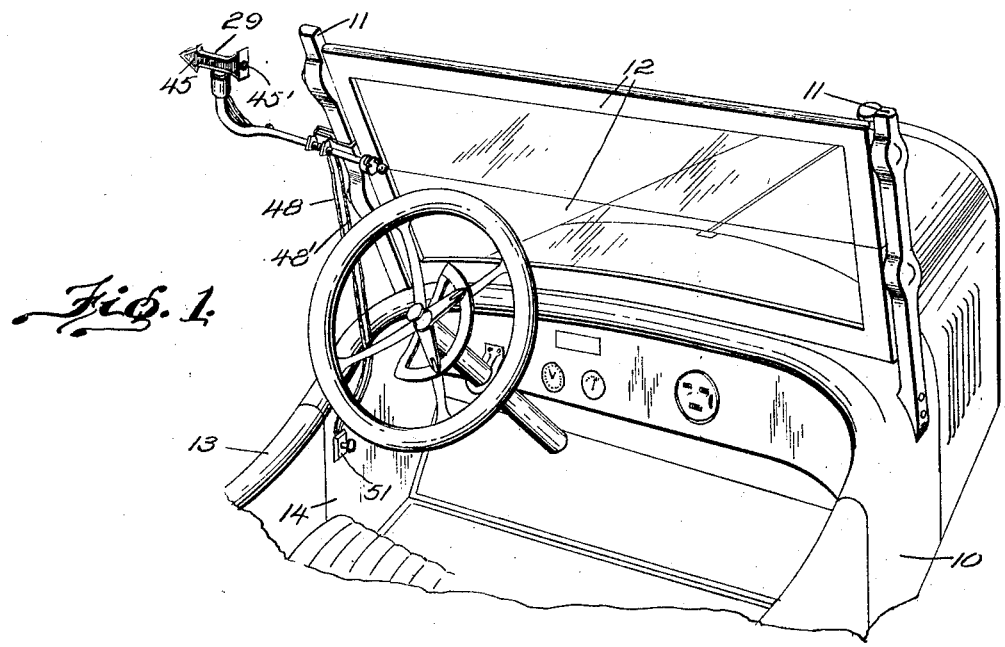
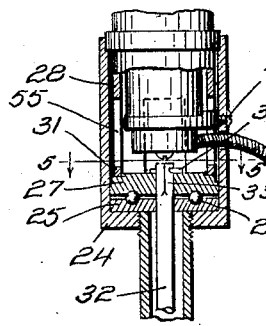
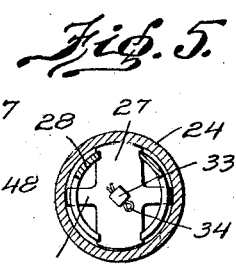
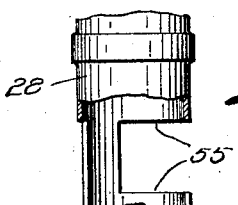
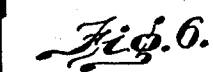
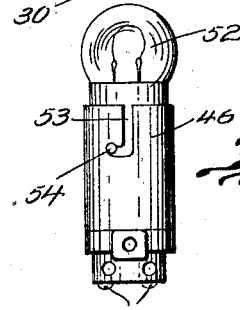
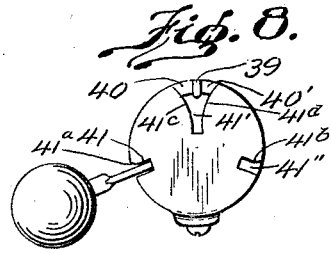
Inventor
A. Weisberg.
By
Geo. P. Kimmel. Attorney

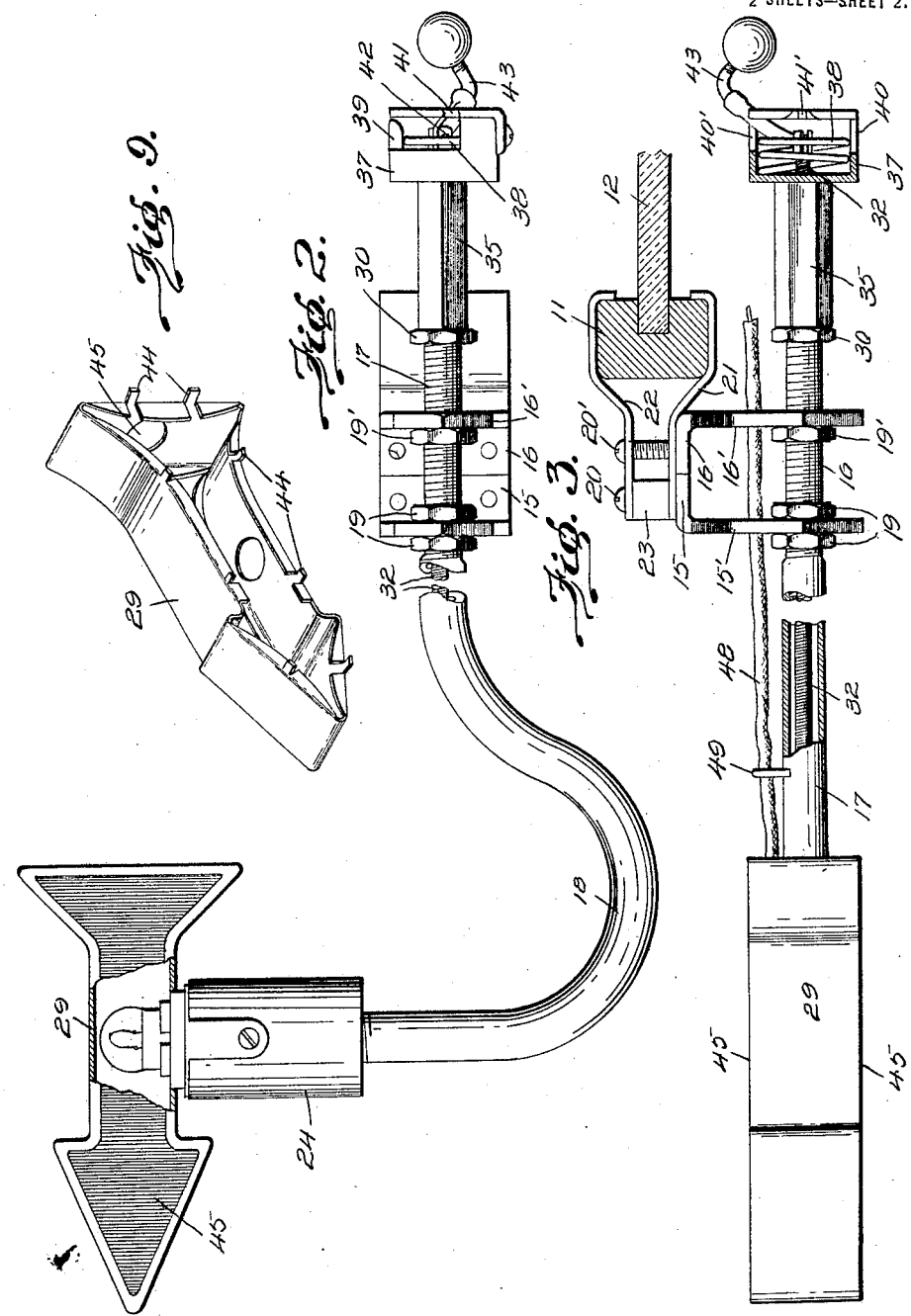

UNITED STATES PATENT OFFICE.

AARON WEISBERG, OF PUEBLO, COLORADO.

AUTOMOBILE SIGNAL.

1,411,392. Specification of Letters Patent. Patented Apr. 4, 1922.

Application filed February 17, 1921. Serial No. 445,805.

*To all whom it may concern:*

Be it known that I, AARON WEISBERG, a citizen of the United States, residing at Pueblo, in the county of Pueblo and State of Colorado, have invented certain new and useful Improvements in an Automobile Signal, of which the following is a specification.

The invention relates to improvements in directional signals for vehicles and more particularly to a type of the same adapted to be manipulated by the driver or operator of the vehicle or automobile, whereby to indicate contemplated stopping or forward and turning movements for the latter.

Among other objects of the invention is to provide for a signal of the character specified, and one that is of comparatively simple and inexpensive construction; that is easily and readily attached to or removed from operative position on the desired portion of a vehicle or automobile; and that is capable of being easily manipulated by the driver or operator for the purposes of the same without interfering to any appreciable degree with his, or her, otherwise close attention and effort necessary for the proper control of the vehicle or automobile.

With the foregoing and other objects in view, the invention resides in the certain novel and useful construction and arrangement of parts as will be hereinafter more fully described, set forth in the appended claims, and illustrated in the accompanying drawings, in which:—

Fig. 1 is a perspective view of the forward portion of an automobile showing the signal in its preferred position thereon, Fig. 2 is a side elevation of the device per se, Fig. 3 is a top plan view of the device as in Fig. 2, Fig. 4 is a fragmentary vertical sectional detail of the signal arm journal, Fig. 5 is a horizontal sectional detail taken on the line 5—5 of Fig. 4, Fig. 6 is a fragmentary detail, partly in section, of the signal arm supporting sleeve, Fig. 7 is an elevation of the signal lamp socket associated with the signal arm journal, Fig. 8 is an end view of the signal arm actuating device, and, Fig. 9 is a perspective view of the signal arm per se, with one of the transparent walls removed therefrom.

Referring to the drawings, wherein similar characters of reference designate corresponding parts in the several views thereof, and more particularly to Fig. 1, the numeral 10 indicates the forward end of an automobile, 11 the oppositely disposed bracket arms between which are supported usual wind shield sections 12, 13 the left forward door leading to the driver's or operator's seat in rear of the steering and control mechanisms, and 14 the side wall portion of the body of the automobile forward of the door 13. In the preferred use of the signaling device, the same is adapted to be clamped to the left hand side of the wind shield 12, or the adjacent bracket thereof, and extended outwardly therefrom, while the signal arm lamp control switch is to be conveniently secured, and preferably so, on the side wall portion 14 immediately adjacent the steering column of the automobile, as shown.

The signal device supporting means comprises a substantially U-shaped bracket member preferably formed of two pieces of strap metal bent substantially L-shaped and arranged in reversed order with the shorter leg portions 15 and 16 thereof opposed one to the other in either of an abutting relation, or spaced apart, as the case may be, with their longer leg portions 15' and 16' disposed in spaced parallel relation, and these latter leg portions are formed with aligned circular openings through which the straight threaded end portion 17 of an outwardly extending signal supporting arm 18 is passed inward of the same to a point slightly in rear of the wind shield 12. The two parts of the bracket, hereinafter to be generally designated by the numerals 15' and 16' are held in either of a closely adjusted position, one with respect to the other, or spaced apart as may be desired or necessary, on the threaded end portion 17 by means of clamping nuts 19 and 19', a pair of which, designated 19, are associated with the bracket part 15', one to either side of the same, and one, designated 19', abutting the inner face of the bracket member 16'. The bracket members 15 and 16 are each provided with suitably arranged openings for the reception of a pair of screw fastenings 20 and 20', by means of which a pair of clamping elements or arms 21 and 22 are secured in position thereon. The inner clamping arm 21 is laid against the outer faces of the parts 15 and 16 and the outer clamping member 22 is held in spaced relation with respect thereto by means of a block 23, the screw fastening 20 being passed through openings formed slightly inward of the secured end of the clamping member 21, through the block 23, through similarly formed openings in the clamping member 22, and into threaded engagement with openings complemental thereto in the part 15 of the bracket, while the screw fastenings 20' are passed through registering openings formed in the members 21 and 22 inward of the plane of the inner face of the block 23 and are threaded into complemental openings in the bracket part 16. The free ends of the clamping members 21 and 22 are suitably shaped to engage the opposite side faces of the frame of the wind shield 12, or of one of the bracket arms 11, preferably at the left side of the vehicle, supporting the latter. By adjusting the clamp bracket thus provided along the threaded end 17 of the signal supporting arm 18, the signal arm may be properly positioned at the same distance outward from the side of cars of different types and makes.

The bracket arm and its threaded portion 17 is of one-piece tubular construction, and the outer end portion 18 is preferably curved downwardly and outwardly with its extreme free end portion straightened out in a vertical direction, and threaded onto the free end thereof is a cylindrical journal housing 24, in the bottom of which is supported a circular bearing member or disk 25, having a center opening in registry with the bore of the arm 18, and an annular groove concentric therewith in which is supported a series of ball bearings 26, upon which, in turn, is supported a bearing disk 27, also having a center opening in registry with the bore of the arm 18 and the center opening of the bearing disk 25, and an annular groove engaging the ball bearings 26. Fitted concentrically within the housing 24 is a cylindrical sleeve or member 28 which is threaded or otherwise secured at its upper end to a signal arm 29, which extends diametrically of the same and consequently of the housing 24, and has its lower end resting on the upper face of the bearing disk 27. The lower end of the sleeve 28 is provided with a pair of diametrically opposed recesses 30 which are engaged over a pair of similarly disposed lugs or projections 31 complemental thereto and rising from the bearing disk 27, whereby the sleeve 28, and the signal arm 29 carried thereby, are rotated correspondingly with the rotation of the disk 27.

Extending entirely through the bracket arm 18 is a flexible cable or shaft 32 which has its outer end passing upwardly through the registering openings of the bearing disks 25 and 27, the extreme end of which, as in 33, being squared to conform to the opening in the bearing disk 27, and is held in engagement therewith by means of a cotter pin 34. The inner end of the flexible shaft 32 passes from the threaded end portion 17, of the arm 18, into the aligning bore of the tubular extension 35, which is secured to the portion 17 by means of a nut 36, and projects outwardly therefrom centrally of a cylindrical casing 37 formed on the free end of the extension 35. The free end of the flexible shaft 32 is tensioned outwardly of the bore of the extension 35 by means of a coiled spring 38 which is disposed concentrically of the casing 37 and abuts the inner wall thereof and has its outer end connected to the shaft end for such purpose. The peripheral wall of the casing 37 is formed at its outer side edge to provide a medial point or projection 39 to either side of which extends circumferentially thereof a pair of slotways 40 and 40'. The outer end wall 37' of this casing is removably secured in position, and is formed with three equidistantly spaced radially extending slots 41, 41' and 41", the slot 41 opening into the lower end of the slotway 40, the slot 41' opening into the adjacent ends of both the slotways 40 and 40' to either side of the medial point 39 and the slot 41" opens into the lower end of the slotway 40'. The slots 41 and 41" have their upper walls curved into the peripheral edge of the end wall 37', as at 41$^a$ and 41$^b$, respectively, while the slot 41' has both of its radially disposed walls curved into the peripheral edge of the end wall 37', as at 41$^c$ and 41$^d$, respectively, in opposite directions to either side of the medial point 39. Pivoted on the free end of the flexible cable or shaft 32 within the casing 37, as at 42, is an actuating lever 43 which extends diagonally upward of the casing to the slotways 40 and 40' and has its outer end bent to extend outwardly and slightly diagonally of the radius of the circular end plate 37'. The free end of the outer portion of the lever 43 is provided with a knob or finger piece 43' by means of which it is to be manipulated. The lever 43 is movable along the slotways 40 and 40' and is engageable in the slots 41, 41' and 41", which slots represent the three operative positions of the signal arm 29, which is rotated to its indicating positions by the movement imparted to the flexible shaft 32 upon the manipulation of the lever 43. The passage of the lever 43 from the slotway 40 to the slotway 40', or vice versa, is made possible by reason of the oppositely curved walls of the radial slot 41' allowing for its movement under the medial point 39.

When the lever 43 is seated in the radial slot 41', the signal arm 29 is held in its normal indicating position parallel to the side of the car, which position is for "straight ahead running" or "stop" movements of the vehicle. With the lever 43 moved from the radial slot 41' through slotway 40 to radial slot 41, the signal arm 29 is moved to indicate "right turn" movement of the vehicle, and when moved from slot 41' through slotway 40' to radial slot 41'', the signal arm 29 is then rotated to indicate "left turn" movement of the vehicle.

The signal arm 29 is preferably in the form of a hollow housing of arrow configuration and has its opposite open sides normally closed by means of arrow-shaped pieces of glass 45, preferably red in color, and the same are held in position by means of bendable tongues 44 formed on the edges of the open sides of the signal arm, while the rear wall of the arm has a circular opening closed by a glass lens 45', preferably green in color.

For the purpose of illuminating the signal arm 29 at night, a cylindrical lamp socket 46 is positioned concentrically within the housing 24 and is secured in such position by means of a screw 47 passing inward of the wall of the housing for the purpose, and current is led to and from the same by means of leads 48 and 48' which are trained outward from the body of the vehicle through suitable openings formed in the bracket members 15' and 16', an eye 49 carried at an intermediate point on the arm 17, and through an opening formed in the wall of the housing 24, their outer free ends being connected to suitable binding screws 50 at the base of the lamp socket 46, while their inner ends are preferably connected to a suitable control switch 51, preferably of a button type, which is conveniently mounted, or otherwise secured on the forward side of the inner face of the wall portion 14 of the body of the vehicle within easy reach of the driver or operator. A suitable form of electric lamp 52 is to be inserted into the socket 46, and the same may be of any usual form, or as shown, of a type requiring bayonet slots 53 being formed in the wall of the socket for the reception of radially extending pins 54, carried on the lamp base.

To permit the proper rotation of the sleeve 28 around the lamp socket 46, the lower end portion of the same is cut away, or circumferentially slotted, as at 55, so as to be free from the leads 48 and 48' and the screw 47 which extends inwardly of the wall of the housing 24 across the path of the same. Also, the upper end of the sleeve 28 is engaged by oppositely disposed clip members 29' which are secured by suitable screw fastenings to the outer wall of the housing 24, whereby accidental displacement of the sleeve and signal arm carried thereby is prevented, such as might otherwise occur in jolting movements of the vehicle over rough roadways. It is to be noted that the current supply for the lamp 52 may be furnished from any suitable source, such as the magneto of the automobile, or from dry or storage batteries, as may be desired or otherwise feasible.

In the use of the signal, when the same is assembled and positioned in the desired manner, or as shown, the normal indicating position of the signal arm 29 is parallel to the side of the vehicle, with the green lens showing to the rear, thus indicating forward travel of the vehicle or that the same is at a standstill. When it is desired to make a right turn, the direction of such turn is to be indicated by moving the lever 43 upward of the slot 41' into slot 40 and downward thereof to slot 41, during which movement of the lever, the flexible cable or shaft 32 will be twisted for the rotation of the bearing disk 27 and the sleeve 28, and, consequently, the signal arm 29 will be moved a quarter turn to the right, or in right angular relation with respect to the vehicle with the point toward the side of the latter. After the turn is completed, the lever 43 is moved back to slot 41' and the signal arm 29 is returned to normal position. Similarly, when a left turn is to be made by the vehicle, the lever 43 is moved to slot 41'' through slot 40' from the slot 41', and the connected parts of the signal actuating mechanism are rotated to move the signal arm 29 to a position at right angles to the body of the vehicle with the point thereof outward and away from the latter. When operating the signal at night, the lamp 52 may be lighted by simply actuating the switch 51 for the purpose.

Having thus fully described my invention, what is claimed is:—

1. In a signaling device of the class described, a bracket arm extending outwardly of a vehicle and having a threaded inner end portion, clamp supporting means adjustably movable along the threaded inner end portion of said bracket arm, a signal arm carried at the outer end of said bracket arm, and means carried at the inner end of said bracket arm for actuating said signal arm from normal indication of forward running or stop position of the vehicle to either of its right and left turn indicating positions.

2. In a signaling device of the class described, a bracket arm extending outwardly of a vehicle and having a threaded inner end portion, a two-part clamping bracket adjustably movable along the threaded inner end portion of said bracket arm, and a signal arm carried at the outer end of said bracket arm, and means carried at the inner end of said bracket arm for actuating said signal arm from normal indication of forward running or stop position to either of its right or left indicating positions.

3. In a signal device of the class described, a bracket arm extending outwardly of a vehicle and having a threaded inner end portion, a two-part clamping bracket mounted on the threaded inner end of said bracket arm, each part thereof being adapted for adjustment one with respect to the other, a signal arm carried at the outer end of said bracket arm, and means carried at the inner end of said bracket arm for actuating said signal arm from normal indication of forward running or stop position of the vehicle to either of its right and left turn indicating positions.

4. In a signal device of the class described, a bracket arm extending outwardly of a vehicle and having a threaded inner end portion, a substantially U-shaped bracket adjustably mounted on the threaded inner end portion of said bracket arm, clamping means for securing said bracket in position after its desired adjustment, a signal arm carried at the outer end of said bracket arm, and means carried at the inner end of said bracket arm for actuating said signal arm from normal indication of forward running or stop position of the vehicle to either of its right and left turn indicating positions.

5. In a signaling device of the class described, a bracket arm extending outwardly of a vehicle and having a threaded inner end portion, a substantially U-shaped bracket having its leg portions adjustably engaged on the threaded inner end portion of said bracket arm, clamping members on the threaded portion of said bracket arm for securing the connected portion of said U-shaped bracket in adjusted position, a signal arm carried at the outer end of said bracket arm, and means carried at the inner end of said bracket arm for actuating said signal arm from normal indication of forward running or stop position of the vehicle to either of its right and left turn indicating positions.

6. In a signaling device of the class described, a bracket arm extending outwardly of a vehicle and having a threaded inner end portion, a two-part substantially U-shaped bracket having its parallel leg portions adjustably engaged on the threaded inner end portion of said bracket arm, clamping members secured to either side of the connected portions of said bracket for securing said bracket arm in adjusted position, a signal arm carried at the outer end of said bracket arm, and means carried at the inner end of said bracket arm for actuating said signal arm from normal indication of forward running or stop position of the vehicle to either of its right and left turn indicating positions.

7. A signal device of the class described comprising a tubular bracket arm extending outwardly of a vehicle, clamping means for said bracket arm, a signal arm journaled in the outer end of said bracket arm, a flexible shaft extending through said bracket arm and operatively connecting said signal arm, an actuating lever pivotally connecting the inner end of said flexible shaft, and means carried at the end of said bracket arm for guiding said lever in its movements for the operation of said signal arm and for retaining the same together with the latter in their several indicative positions.

8. A signal device of the class described comprising a tubular bracket arm extending outwardly of a vehicle, clamping means for said bracket arm, a signal arm journaled in the outer end of said bracket arm, a flexible shaft extending through said bracket arm and operatively connecting said signal arm, a cylindrical casing carried at the free end of said bracket arm and having its peripheral wall formed to provide operatively extending slotways, an actuating lever pivotally connecting the inner free end of said flexible shaft and operable in the slotways of said casing, and means carried at the outer end of said casing and associated with the slotways whereby to permit movement of the lever from one of the slotways to the other thereof and to retain the lever in positions corresponding to the indicating positions of said signal arm.

9. A signal device of the class described comprising a tubular bracket arm extending outwardly of a vehicle, clamping means for said bracket arm, a cylindrical housing carried at the outer free end of said bracket arm, a lamp socket disposed concentrically within said housing, a signal arm sleeve journaled in said housing concentrically between the opposed walls of the latter and said lamp socket, a flexible shaft extending through said bracket arm and operatively connecting said signal arm sleeve, and means carried at the inner end of said bracket arm and connecting said flexible shaft by actuating said signal arm sleeve for moving the signal arm thereof to and from either of its indicating positions.

In testimony whereof, I affix my signature hereto.

AARON WEISBERG.